(12) United States Patent
Tanizawa et al.

(10) Patent No.: US 8,601,568 B2
(45) Date of Patent: Dec. 3, 2013

(54) COMMUNICATION SYSTEM FOR AUTHENTICATING OR RELAYING NETWORK ACCESS, RELAYING APPARATUS, AUTHENTICATION APPARATUS, AND COMMUNICATION METHOD

(75) Inventors: Yoshimichi Tanizawa, Kanagawa (JP); Naoki Esaka, Kanagawa (JP); Tsutomu Shibata, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1314 days.

(21) Appl. No.: 12/128,741

(22) Filed: May 29, 2008

(65) Prior Publication Data

US 2009/0025079 A1 Jan. 22, 2009

(30) Foreign Application Priority Data

May 31, 2007 (JP) ................................ 2007-144906

(51) Int. Cl.
*G06F 21/00* (2013.01)
(52) U.S. Cl.
USPC ...... 726/14; 726/3; 726/11; 726/15; 713/151; 713/163; 713/169
(58) Field of Classification Search
USPC .......................................................... 726/14
See application file for complete search history.

(56) References Cited

U.S. PATENT DOCUMENTS

| | | | | |
|---|---|---|---|---|
| 6,058,431 | A * | 5/2000 | Srisuresh et al. | 709/245 |
| 6,161,139 | A * | 12/2000 | Win et al. | 709/225 |
| 6,577,733 | B1 * | 6/2003 | Charrin | 380/251 |
| 7,260,638 | B2 * | 8/2007 | Crosbie | 709/229 |
| 7,360,075 | B2 * | 4/2008 | VanHeyningen et al. | 713/151 |
| 8,046,829 | B2 * | 10/2011 | Oba | 726/14 |
| 8,136,144 | B2 * | 3/2012 | Tanizawa et al. | 726/3 |
| 2002/0066029 | A1 * | 5/2002 | Yi | 713/201 |
| 2003/0142681 | A1 * | 7/2003 | Chen et al. | 370/401 |
| 2004/0098588 | A1 * | 5/2004 | Ohba et al. | 713/169 |
| 2006/0259583 | A1 * | 11/2006 | Matsuura | 709/218 |
| 2007/0300289 | A1 * | 12/2007 | Tanizawa et al. | 726/3 |
| 2009/0210542 | A1 * | 8/2009 | Xia et al. | 709/229 |

FOREIGN PATENT DOCUMENTS

| | | |
|---|---|---|
| JP | 2003-216579 | 7/2003 |
| JP | 2006-67057 | 3/2006 |
| JP | 2006-352468 | 12/2006 |

OTHER PUBLICATIONS

"Protocol for carrying Authentication for Network Access (pana)," http://www.ietf.org/html.charters/pana-charter.html.
"Protocol for carrying Authentication for Network Access (pana)," http://www.ietf.org/html.charters/pana-charter.html, Apr. 25, 2008, pp. 1-4.

* cited by examiner

*Primary Examiner* — Kambiz Zand
*Assistant Examiner* — Yonas Bayou
(74) *Attorney, Agent, or Firm* — Finnegan, Henderson, Farabow, Garrett & Dunner, L.L.P.

(57) ABSTRACT

A switching equipment stores identification information of communication established with respect to an infrastructure network system in a storage unit, and when an access request is received from a terminal device, the switching equipment adds the stored identification information to the access request and transfers the access request to a 1× Radius server. When the terminal device having requested the access is authenticated, the 1× Radius server notifies a PANA PAA of address information of the terminal device associated with the identification information added to the access request. The PANA PAA approves the same network access as the switching equipment with respect to the terminal device in the received address information.

11 Claims, 11 Drawing Sheets

FIG.3

| PHYSICAL PORT | DEVICE ADDRESS OF TERMINAL DEVICE | 802.1X AUTHENTICATION STATE |
|---|---|---|
| 1 | 00: 11: 22: 33: 44: 55 | ACCEPT |
| 2 | 00: 11: 22: 33: 44: 56 | ACCEPT |
| 3 | 00: 11: 22: 33: 44: 57 | REJECT |
| ⋮ | ⋮ | ⋮ |

FIG.4

| PANA AUTHENTICATION STATE | PANA SESSION ID |
|---|---|
| AUTHENTICATED | 0000111 |

FIG.7

| DEVICE ADDRESS OF TERMINAL DEVICE | 802.1X AUTHENTICATION STATE | PANA SESSION ID | IP ADDRESS OF TERMINAL DEVICE |
|---|---|---|---|
| 00: 11: 22: 33: 44: 55 | ACCEPT | 0000111 | 192. 168. 0. 55 |
| 00: 11: 22: 33: 44: 56 | ACCEPT | 0000111 | 192. 168. 0. 56 |
| 00: 11: 22: 33: 44: 57 | REJECT | 0000111 | 192. 168. 0. 57 |
| ⋮ | ⋮ | ⋮ | ⋮ |

FIG.9

| SWITCHING DEVICE ID | PANA SESSION ID | PANA AUTHENTICATION STATE |
|---|---|---|
| 11: 11: 11: 11: 11: 11 | 0000111 | AUTHENTICATED |
| 11: 11: 11: 11: 11: 12 | 0000112 | AUTHENTICATED |
| 11: 11: 11: 11: 11: 13 | - | UNAUTHENTICATED |
| ⋮ | ⋮ | ⋮ |

| SWITCHING EQUIPMENT ID | ASSOCIATED PANA EP(s) | | | |
|---|---|---|---|---|
| | EP ID: 001<br>EP IP ADDRESS:<br>192.168.0.211 | EP ID: 002<br>EP IP ADDRESS:<br>192.168.0.212 | EP ID: 003<br>EP IP ADDRESS:<br>192.168.0.213 | EP ID: 004<br>EP IP ADDRESS:<br>192.168.0.214 |
| 11:11:11:11:11:11 | ○ | ○ | × | × |
| 11:11:11:11:11:12 | ○ | ○ | ○ | × |
| 11:11:11:11:11:13 | × | ○ | × | ○ |
| ... | ... | ... | ... | ... |

FIG.11

| PANA SESSION ID | IP ADDRESS |
|---|---|
| 0000111 | 192.168.0.55, 192.168.0.56 |
| 0000112 | 192.168.0.99 |
| ... | ... |

COMMUNICATION SYSTEM FOR AUTHENTICATING OR RELAYING NETWORK ACCESS, RELAYING APPARATUS, AUTHENTICATION APPARATUS, AND COMMUNICATION METHOD

CROSS-REFERENCE TO RELATED APPLICATIONS

This application is based upon and claims the benefit of priority from the prior Japanese Patent Application No. 2007-144906, filed on May 31, 2007; the entire contents of which are incorporated herein by reference.

BACKGROUND OF THE INVENTION

1. Field of the Invention

The present invention relates to a communication system that performs access authentication to a network, a relaying apparatus that relays communication related to access authentication, an authentication apparatus that performs access authentication, and a communication method.

2. Description of the Related Art

A network access authentication protocol has been heretofore used as a protocol for allowing network access only to a terminal authenticated for a certain network system.

For example, in "Protocol for carrying Authentication for Network Access (PANA)", [online], retrieved from the Internet: <URL:http://www.ietf.org/html.charters/PANA-charter.html>, a network access authentication protocol referred to as Protocol for Carrying Authentication for Network Access (PANA) has been proposed. The PANA is a network access authentication protocol being standardized by the Internet Engineering Task Force (IETF), which operates on a User Datagram Protocol (UDP). In the PANA, various approval policies can be set after authentication. For example, it can be set as the approval policy to perform filter setting to a plurality of routers with respect to an IP address of a target terminal device.

Further, a network access authentication protocol referred to as the Institute of Electrical and Electronic Engineers (IEEE) 802.1X has been widely known as well. The IEEE 802.1X protocol is a network access authentication protocol standardized by the IEEE, which operates on a local area network (LAN). According to the IEEE 802.1X protocol, only opening/closing of an LAN port with respect to a device address of the target terminal device can be set as the approval policy.

Thus, while there is a plurality of types of the network access authentication protocol, there is no compatibility with each other. However, there can be a case that different network access authentication protocols need to be connected with each other and operated.

For example, there can be cases such that (1) network systems using different network access authentication protocols are integrated into one system, (2) the network access authentication protocol is shifted to change the network access approval policy, and (3) a terminal applicable only to a network access authentication protocol having a simple approval policy is connected to a network system adopting the network access authentication protocol adopting a more complicated approval policy.

To realize unified network access authentication by integrating a plurality of network access authentication protocols, generally, one network access authentication protocol is adopted, and all components constituting the network system need to correspond to the adopted one network access authentication protocol.

Further, when the network access authentication protocols are integrated in this manner, there are requirements such that (1) any change is not required for a terminal connected to the network system, (2) the integrated network access authentication protocols can be authenticated uniformly by using one authentication server and one authentication database, even in the case of correspondence to a plurality of network access authentication protocols, and (3) there is little modification of the network system itself.

However, it is difficult to have all the components constituting the network system corresponded to the same network access authentication protocol. For example, the components required for the network system and the adoptable approval policies are different for each network access authentication protocol. Therefore, when the network access authentication protocols are integrated into another protocol, the components may be insufficient, or the approval policy may not be realized.

As one method of integrating the networks, a method in which a terminal function of one protocol (for example, PANA) and a switching equipment having a relay function of the other protocol (for example, IEEE 802.1X) are installed between the terminal device and the network system can be considered.

However, according to this method, although approval of the network access becomes possible by the IEEE 802.1X protocol via the switching equipment, the approval policy of the PANA cannot be applied to the terminal corresponding only to the IEEE 802.1X protocol, because a difference of the approval policies is not taken into consideration. That is, the approval policy cannot be realized, thereby causing a problem in that an access to the network system from the terminal device is restricted.

SUMMARY OF THE INVENTION

According to one aspect of the present invention, a communication system includes a first relaying apparatus that relays communication from a terminal device connected via a first network to a second network; a second relaying apparatus that relays communication to a first authentication apparatus that is connected to the first relaying apparatus via a second network and authenticates the terminal device according to a first authentication protocol; and a second authentication apparatus that is connected to the first relaying apparatus via the second network and performs access authentication for the first relaying apparatus with respect to the second network according to a second authentication protocol, wherein the first relaying apparatus includes: an identification-information storage unit that can store identification information for identifying communication for the first relaying apparatus to access the second network; a request transmitting unit that transmits a first request message to the second authentication apparatus, the first request message requesting access authentication for the first relaying apparatus to access the second network; a result receiving unit that receives a determination result of whether to approve an access of the first relaying apparatus to the second network, which is a response to the first request message, from the second authentication apparatus; a communication establishing unit that establishes communication from the first relaying apparatus to the second network, and stores the identification information of the established communication in the identification-information storage unit, when the determination result indicating approval of the access of the first relaying apparatus to the second network is received; a first request receiving unit that receives a second request message from the terminal device, the second request message requesting access authentication for the terminal device to access the second network; and a transfer unit that obtains the identification information from the identification-information storage unit and transfers the second request message added with the obtained identification information to the second relaying apparatus, when the second request message is received, the second relaying apparatus includes: a relay unit that receives the second request message added with the obtained identification information from the first relaying apparatus and relays the received second request message to the first authentication apparatus; and a notifying unit that notifies the second authentication apparatus of address information of the authenticated terminal device associated with the identification information added to the second request message, when the terminal device as a sender of the second request message is authenticated by the first authentication apparatus, and the second authentication apparatus includes: a second request receiving unit that receives a first request message from the first relaying apparatus; a determining unit that determines whether to approve an access of the first relaying apparatus to the second network based on the received first request message and confirms an access method preset for each first relaying apparatus, with respect to the first relaying apparatus whose access has been approved; a result transmitting unit that transmits a determination result by the determining unit to the first relaying apparatus; an address receiving unit that receives the address information associated with the identification information from the second relaying apparatus; and an approval unit that approves an access of the terminal device in the received address information to the second network by the access method confirmed for the first relaying apparatus, which has established communication identified by the identification information associated with the received address information.

According to another aspect of the present invention, an authentication apparatus that is connected to a first relaying apparatus that relays communication from a terminal device connected via a first network to a second network and to a second relaying apparatus that relays communication to an external authentication apparatus that authenticates the terminal device according to a first authentication protocol via the second network, and authenticates an access to the second network according to a second authentication protocol, the authentication apparatus includes a request receiving unit that receives a request message from the first relaying apparatus, the request message requesting access authentication for the first relaying apparatus to access the second network; a determining unit that determines whether to approve an access of the first relaying apparatus to the second network based on the received request message and confirms an access method preset for each first relaying apparatus, with respect to the first relaying apparatus whose access has been approved; a result transmitting unit that transmits a determination result by the determining unit to the first relaying apparatus; an address receiving unit that receives the address information of the terminal device associated with identification information for identifying communication with the first relaying apparatus whose access to the second network has been approved, from the second relaying apparatus; and an approval unit that approves an access of the terminal device in the received address information to the second network by the access method confirmed for the first relaying apparatus, which has established communication identified by the identification information associated with the received address information.

According to still another aspect of the present invention, a relaying apparatus that is connected to a terminal device via a first network, and connected via a second network to an external device that relays communication to a first authentication apparatus that authenticates the terminal device according to a first authentication protocol, and to a second authentication apparatus that performs access authentication to the second network according to a second authentication protocol, thereby relaying communication from the terminal device to the second network, the relaying apparatus includes an identification-information storage unit that can store identification information for identifying communication for the relaying apparatus to access the second network; a request transmitting unit that transmits a first request message to the second authentication apparatus, the first request message requesting access authentication for the relaying apparatus to access the second network; a result receiving unit that receives a determination result of whether to approve an access of the relaying apparatus to the second network, which is a response to the first request message, from the second authentication apparatus; a communication establishing unit that establishes communication to the second network, and stores the identification information of the established communication in the identification-information storage unit, when the determination result indicating approval of the access of the relaying apparatus to the second network is received; a request receiving unit that receives a second request message from the terminal device, the second request message requesting access authentication for the terminal device to access the second network; and a transfer unit that obtains the identification information from the identification-information storage unit and transfers the second request message added with the obtained identification information to the external device, when the second request message is received.

According to still another aspect of the present invention, a relaying apparatus that is connected to an external device that relays communication from a terminal device connected via a first network to a second network and to a second authentication apparatus that performs access authentication to the second network according to a second authentication protocol via the second network, and relays communication to a first authentication apparatus that authenticates the terminal device according to a first authentication protocol, the relaying apparatus includes a relay unit that receives from the external device a request message for requesting authentication of an access of the terminal device to the second network, added with identification information for identifying communication for the external device to access the second network, and relays the received request message to the first authentication apparatus; and a notifying unit that notifies the second authentication apparatus of address information of the authenticated terminal device associated with the identification information added to the request message, when the terminal device as a sender of the request message is authenticated by the first authentication apparatus.

According to still another aspect of the present invention, a communication method performed by a communication system that includes a first relaying apparatus that relays communication from a terminal device connected via a first network to a second network; a second relaying apparatus that relays communication to a first authentication apparatus that is connected to the first relaying apparatus via the second network and authenticates the terminal device according to a first authentication protocol; and a second authentication apparatus that is connected to the first relaying apparatus via the second network and performs access authentication for the first relaying apparatus with respect to the second network according to a second authentication protocol, the communication method includes transmitting a first request message to the second authentication apparatus, the first request message requesting access authentication for the first relaying apparatus to access the second network; receiving the first request message from the first relaying apparatus; determining whether to approve an access of the first relaying apparatus to the second network based on the received first request message, to confirm an access method preset for each first relaying apparatus, with respect to the first relaying apparatus whose access has been approved; transmitting a determination result of whether to approve the access to the first relaying apparatus; receiving the determination result from the second relaying apparatus; establishing communication from the first relaying apparatus to the second network, when the determination result indicating approval of the access of the first relaying apparatus to the second network is received, and storing the identification information for identifying the established communication in a storage unit; receiving a second request message from the terminal device, the second request requesting access authentication for the terminal device to access the second network; obtaining the identification information from the storage unit and transferring the second request message added with the obtained identification information to the second relaying apparatus, when the second request message is received, receiving the second request message added with the identification information from the first relaying apparatus, and relaying the received second request message to the first authentication apparatus; notifying the second authentication apparatus of address information of the authenticated terminal device associated with the identification information added to the second request message, when the terminal device as a sender of the second request message is authenticated by the first authentication apparatus; receiving the address information associated with the identification information from the second relaying apparatus; and approving the access of the terminal device in the received address information to the second network by the access method confirmed for the first relaying apparatus, which has established communication identified by the identification information associated with the received address information.

BRIEF DESCRIPTION OF THE DRAWINGS

FIG. 3 is a schematic diagram for explaining an example of a structure of data stored in a terminal authentication-state table;

FIG. 4 is a schematic diagram for explaining an example of a structure of data stored in a session information table;

FIG. 7 is a schematic diagram for explaining an example of a structure of data stored in a terminal-PANA correspondence table;

FIG. 9 is a schematic diagram for explaining an example of a structure of data stored in a PANA authentication table;

FIG. 10 is a schematic diagram for explaining an example of a structure of data stored in a PANA-EP correspondence table;

FIG. 11 is a schematic diagram for explaining an example of a structure of data stored in an approved address management table;

DETAILED DESCRIPTION OF THE INVENTION

Exemplary embodiments of a communication system, a relaying apparatus, an authentication apparatus, and a communication method according to the present invention will be explained below in detail with reference to the accompanying drawings.

A communication system according to an embodiment of the present invention integrates a network using the 802.1X protocol as a first authentication protocol with a network using the PANA as a second authentication protocol, thereby enabling to apply an authentication policy of the PANA, even to a terminal only corresponding to the 802.1X protocol.

Figure 1:
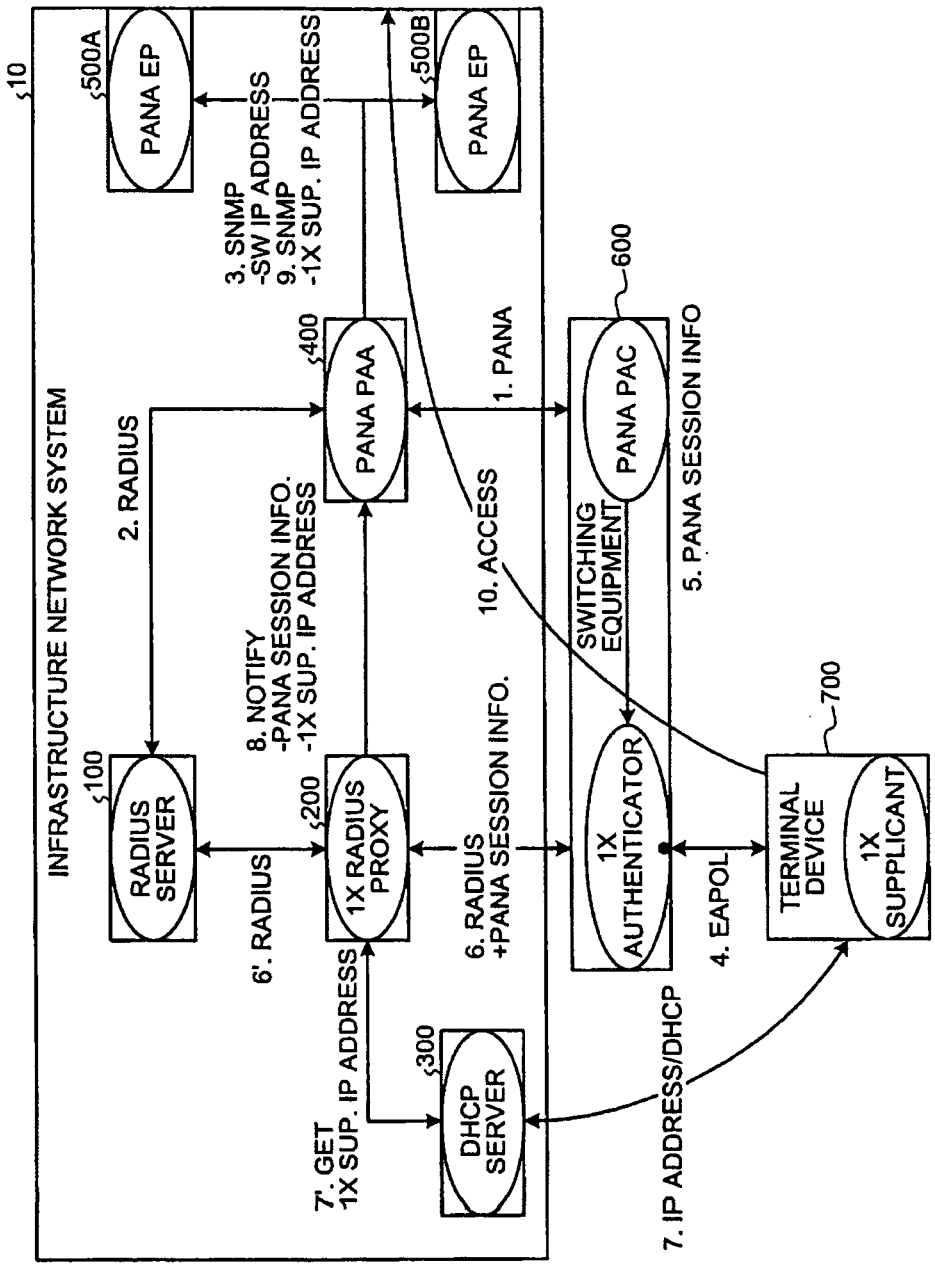
FIG. 1 is a schematic diagram for explaining a configuration of a communication system according to an embodiment of the present invention.

The configuration of the communication system according to the embodiment is explained first with reference to FIG. 1.

Components of the communication system according to the embodiment are explained. The communication system according to the embodiment includes an infrastructure network system 10, a terminal device 700 connected to an outside network of the infrastructure network system 10, and a switching equipment 600 that relays communication between the terminal device 700 and the infrastructure network system 10. The switching equipments 600 and the terminal devices 700 can be plural. An outline of each component is explained below.

The infrastructure network system 10 indicates an integrated network system itself, and adopts the PANA as the network access authentication protocol. The terminal corresponding to the PANA as the network access authentication protocol can receive approval of network access by connecting to the infrastructure network system 10.

Although not shown, in the infrastructure network system 10, a plurality of servers that provides information service to the terminals connected thereto is operated. The infrastructure network system 10 can be realized as a single apparatus; however, it is generally configured as a network including a plurality of server devices.

The infrastructure network system 10 includes a Remote Authentication Dial In User Service (Radius) server 100, a 1× Radius proxy 200, a Dynamic Host Configuration Protocol (DHCP) server 300, a PANA authentication Agent (PANA PAA) 400, and PANA EPs 500a and 500b. Among these, servers and the like other than the Radius server 100 can be present in plural.

The switching equipment 600 acts as an intermediary for communication between the terminal device 700 and the infrastructure network system 10. Further, the switching equipment 600 has a role of connecting the terminal device 700 adopting the 802.1X protocol as the network access authentication protocol to the infrastructure network system 10 adopting the PANA as the network access authentication protocol. Therefore, as shown in FIG. 1, the switching equipment 600 has a PANA client (PANA PaC) function and a 1× Authenticator function.

The PANA PaC function is a terminal function of the network access authentication protocol PANA. That is, the PANA PaC function is for starting network access authentication by the PANA to receive approval of network access.

The 1× Authenticator function is a relay function of the network access authentication protocol 802.1X. That is, it is a function for executing an Extensible Authentication Protocol over LAN (EAPoL) protocol between the terminal device 700 and the switching equipment 600, and executing a RADIUS protocol between the 1× Radius proxy 200 or the Radius server 100 and the switching equipment 600, thereby performing network access authentication of the terminal device 700. The 1× Authenticator function also includes a function of opening/closing a port to which the terminal device 700 is connected, in order to set network access approval of the terminal device 700 according to a result of network access authentication.

The terminal device 700 is an apparatus corresponding only to the 802.1X protocol as the network access authentication protocol. The terminal device 700 is connected to the infrastructure network system 10, as other terminals (not shown) corresponding to the PANA, to request to receive the service from the server operated in the infrastructure network system 10. To connect to the infrastructure network system 10, network access authentication is required. However, because the terminal device 700 corresponds only to the 802.1X protocol, it cannot receive network access authentication by being directly connected to the infrastructure network system 10 adopting the PANA.

In the present embodiment, network access authentication by the PANA can be applied to the terminal device 700 corresponding only to the 802.1X protocol, by the 1× Radius proxy 200, the PANA PAA 400, and the function of the switching equipment 600.

The terminal device 700 has a 1× Supplicant function for executing the 802.1X protocol. This is a terminal function of the network access authentication protocol 802.1X. That is, the function is for starting network access authentication by the 802.1X protocol to receive approval of network access. The terminal device 700 is connected to the infrastructure network system 10 via the switching equipment 600.

The Radius server 100 is a server device for processing the RADIUS protocol, which is an authentication protocol for network access authentication. When network access authentication is to be performed, the Radius server 100 confirms whether to authenticate the terminal device 700, for both protocols of PANA and 802.1X.

The 1× Radius proxy 200 is a server device for relaying the RADIUS protocol for 802.1X to the Radius server 100. Further, when authentication according to the 802.1X protocol is successful, the 1× Radius proxy 200 transfers data with the DHCP server 300 and the PANA PAA 400, to perform network access authentication of the terminal device 700 by the PANA adopted by the infrastructure network system 10.

The DHCP server 300 allocates an IP address to the authenticated terminal device 700.

The PANA PAA 400 is a relay server device according to the network access authentication protocol PANA. The PANA PAA 400 executes the PANA protocol with the PANA PaC function of the switching equipment 600 and executes the RADIUS protocol with the Radius server 100, thereby performing network access authentication of the switching equipment 600 having the PANA PaC function. Further, the PANA PAA 400 communicates with the PANA EP 500 to set network access approval according to the result of the network access authentication.

The PANA EP 500 is an apparatus to which the approval policy corresponding to the result of network access authentication is set. Specifically, the PANA EP 500 is configured as a router or a switch that approves the network access by specifying the IP address to set whether to approve the network access.

The communication system according to the present embodiment is not limited to the above configuration. For example, any one of the devices included in the infrastructure network system 10 can be realized as the same frame. Further, such a configuration is also possible that a function of a device as a part of the infrastructure network system 10, such as the function of the 1× Radius proxy 200, is arranged in the switching equipment 600.

An outline of a sequence of an access authentication process by each device configured as described above is explained next. In FIG. 1, the sequence of the access authentication process is expressed by the number added to an arrow between respective devices. The sequence expresses a procedure for accurately approving the network access of the terminal device 700 in the infrastructure network system 10, by connecting the switching equipment 600 to the infrastructure network system 10, and connecting the terminal device 700 corresponding only to the 802.1X protocol to the switching equipment 600, thereby connecting the terminal device 700 to the infrastructure network system 10 corresponding to the PANA and adopting the approval policy by the PANA.

According to the 802.1X protocol, the terminal device 700 is authenticated by a device address of the terminal device 700.

(1) The switching equipment 600 is connected to the infrastructure network system 10. At this time, the network access authentication protocol PANA is executed between the PANA PaC function of the switching equipment 600 and the PANA PAA 400.

(2) The PANA PAA 400 that has started the network access authentication of the switching equipment 600 executes the RADIUS protocol with the Radius server 100 to execute authentication of the switching equipment 600. Accordingly, network access of the switching equipment 600 is approved by the PANA PAA 400, and a PANA session is established between the PANA PAA 400 and the switching equipment 600.

(3) When the network access of the switching equipment 600 is approved according to the execution result of the PANA protocol and the RADIUS protocol, an IP address of the switching equipment 600 is notified to the PANA EP 500 by a simple network management protocol (SNMP) or the like, according to the approval policy set to the PANA PAA 400. The PANA EP 500 having received the notification approves the IP address of the specified switching equipment 600. Accordingly, the network access of the switching equipment 600 to the infrastructure network system 10 is approved.

(4) The terminal device 700 is connected to the switching equipment 600. At this time, the EAPoL protocol for the network access authentication protocol 802.1X is executed between the 1× Supplicant function of the terminal device 700 and the 1× Authenticator function of the switching equipment 600. The configuration can be such that at a point in time when the terminal device 700 is connected to the switching equipment 600, the switching equipment 600 starts the sequences 1 to 3, and thereafter, starts the process according to the EAPoL protocol.

(5) In the switching equipment 600, PANA session information relating to the PANA PaC function is notified to the 1× Authenticator function. Accordingly, the switching equipment 600 associates the PANA session information with the 802.1X authentication protocol.

(6) The switching equipment 600 having started network access authentication of the terminal device 700 executes the RADIUS protocol with the 1× Radius proxy 200 to execute the 802.1X authentication of the terminal device 700. At this time, the PANA session information relating to the PANA PaC function of the switching equipment 600 is added to a message according to the normal RADIUS protocol and transmitted.

(6') The 1× Radius proxy 200 holds the PANA session information added to the message according to the RADIUS protocol, and relays the message according to the RADIUS protocol, from which the PANA session information has been removed, to the Radius server 100. The reason why the PANA session information is removed is that the Radius server 100 handles only normal processes according to the RADIUS protocol, so as not to be aware of the extension according to the present embodiment. Accordingly, the network access of the terminal device 700 is approved by the switching equipment 600. As a result, the switching equipment 600 opens/closes the port to which the terminal device 700 is connected, and thereafter, relays the normal network access from the terminal device 700 to the infrastructure network system 10.

(7) The terminal device 700 whose network access has been approved by the switching equipment 600 requests allocation of an IP address to the own device to the DHCP server 300 by executing the DHCP protocol. Meanwhile, the DHCP server 300 allocates an IP address to the terminal device 700 in response thereto.

(7') Upon completion of network access authentication of the terminal device 700, the 1× Radius proxy 200 inquires of the DHCP server 300 for the IP address allocated to the terminal device 700, using the device address of the terminal device 700 possessed at the time of network access authentication of the terminal device 700 as a key. The 1× Radius proxy 200 obtains the IP address of the terminal device 700 returned from the DHCP server 300.

(8) The 1× Radius proxy 200 notifies the PANA PAA 400 of the IP address of the terminal device 700 obtained in (7) and the PANA session information of the terminal device 700 obtained in (6). Accordingly, network access approval by the PANA required for approving the network access of the terminal device 700 is requested to the PANA PAA 400. The PANA PAA 400 specifies the switching equipment 600 authenticated by the PANA, to which the terminal device 700 is connected, according to the IP address of the terminal device 700 authenticated by the 802.1X protocol and the approval policy set to the PANA PAA 400 in the information notified from the 1× Radius proxy 200. Further, the PANA PAA 400 specifies the PANA EP 500 that requires setting for performing network access approval by the PANA with respect to the terminal device 700 authenticated according to the 802.1X protocol, from the specified switching equipment 600.

(9) The PANA PAA 400 notifies the PANA EP 500, for which setting is required for performing network access approval of the terminal device 700, which is authenticated according to the 802.1X protocol, by the PANA, of the IP address of the terminal device 700 according to the SNMP or the like. In response thereto, the PANA EP 500 approves the communication of the specified terminal device 700. Thus, network access of the terminal device 700 to the infrastructure network system 10 is approved.

(10) Thereafter, network access of the terminal device 700 to the infrastructure network system 10 can be performed via the switching equipment 600.

Detailed configurations of respective devices constituting the communication system according to the present embodiment are explained next. The configuration of the switching equipment 600 is explained first with reference to FIG. 2.

Figure 2:
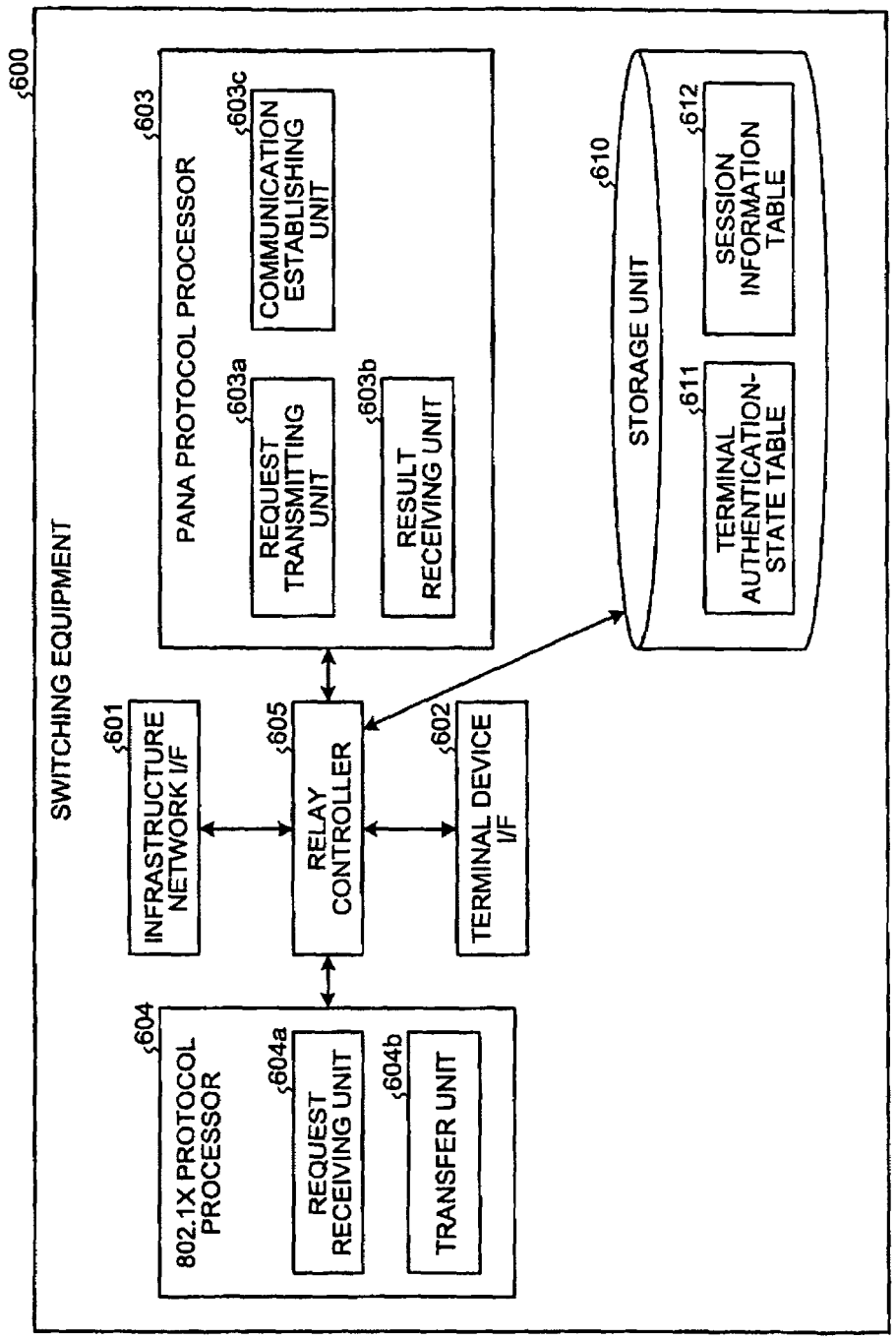
FIG. 2 is a block diagram of a configuration of a switching equipment according to the embodiment.

As shown in FIG. 2, the switching equipment 600 includes an infrastructure network interface (I/F) 601, a terminal device interface (I/F) 602, a PANA protocol processor 603, an 802.1X protocol processor 604, a relay controller 605, and a storage unit 610.

The storage unit 610 stores information related to access authentication, and stores a terminal authentication-state table 611 and a session information table 612.

The terminal authentication-state table 611 stores authentication states for each terminal device 700. As shown in FIG. 3, the terminal authentication-state table 611 stores number for identifying a physical port to which the terminal device 700 is connected, the device address of the terminal device 700, and the authentication state of the terminal device 700 (802.1X authentication state) in association with each other. As the authentication state, for example, "Accept" is set when the terminal device 700 is authenticated, and "Reject" is set when not authenticated.

Referring back to FIG. 2, the session information table 612 stores the authentication state of the switching equipment 600 by the PANA PAA 400 and the PANA session information relating to the PANA session when the switching equipment 600 is authenticated.

As shown in FIG. 4, the session information table 612 stores the authentication state of the switching equipment 600 by the PANA PAA 400 and PANA session ID for identifying the PANA session as the PANA session information. The PANA session information is not limited thereto, and for example, other pieces of information relating to the session, such as the IP address of the switching equipment 600 can be included.

Referring back to FIG. 2, the infrastructure network I/F 601 is a network interface used at the time of communicating with respective devices in the infrastructure network system 10. The terminal device I/F 602 is an Ethernet (registered trademark) port physically connected to the terminal device 700.

The PANA protocol processor 603 executes the PANA protocol with the PANA PAA 400 in the infrastructure network system 10 to approve the network access of the switching equipment 600 to the infrastructure network system 10. That is, the PANA protocol processor 603 includes a terminal function of the PANA protocol generally referred to as PANA PaC.

Further, the PANA protocol processor 603 further includes a request transmitting unit 603a, a result receiving unit 603b, and a communication establishing unit 603c.

The request transmitting unit 603a transmits a message for requesting network access authentication of the switching equipment 600 to the PANA PAA 400. The result receiving unit 603b receives an authentication result of the network access authentication from the PANA PAA 400. The communication establishing unit 603c establishes the PANA session between the PANA PAA 400 and the PANA protocol processor 603, when the network access has been approved, and stores information relating to the established PANA session (PANA session information) in the session information table 612 in the storage unit 610.

The 802.1X protocol processor 604 executes the 802.1X protocol to relay the network access authentication protocol with respect to the infrastructure network system 10 for the terminal device 700 connected to the terminal device I/F 602. Specifically, the 802.1X protocol processor 604 executes the EAPoL protocol with the terminal device 700', and executes the RADIUS protocol with the 1× Radius proxy 200 in the infrastructure network system 10.

The 802.1X protocol processor 604 further includes a request receiving unit 604a and a transfer unit 604b. The request receiving unit 604a receives a message for requesting access authentication to the infrastructure network system 10 from the terminal device 700.

The transfer unit 604b transfers the message for requesting access authentication, added with the PANA session information stored in the session information table 612, to the 1× Radius proxy 200.

Figure 5:
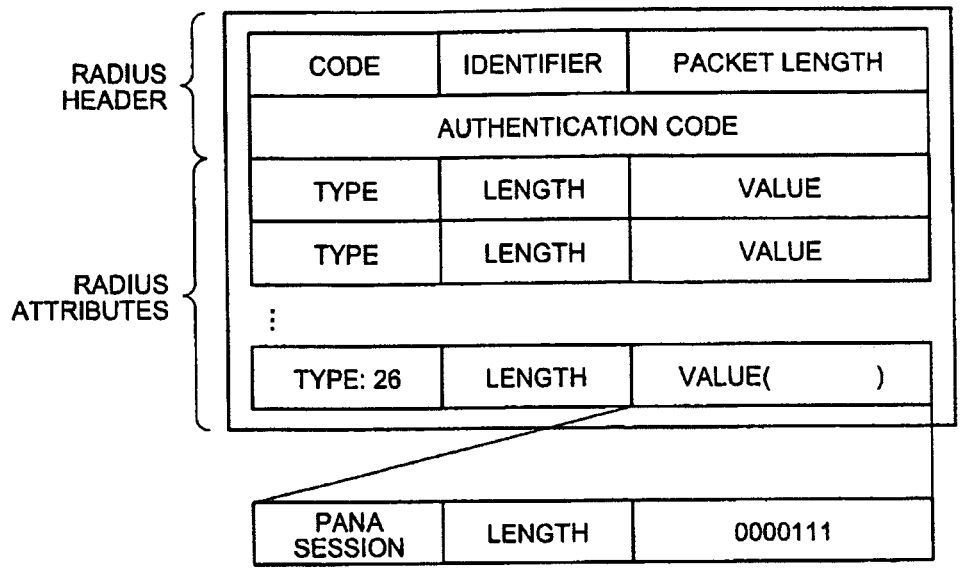
FIG. 5 is a schematic diagram for explaining an example of a message according to a RADIUS protocol.

FIG. 5 depicts a packet configuration example of the RADIUS protocol in which the PANA session information is added as a RADIUS attribute. The RADIUS packet includes a RADIUS header and a plurality of RADIUS attributes. The RADIUS header includes a code indicating the type of the message, an identifier of the message, a packet length, and an authentication code for authentication. The individual RADIUS attribute includes type indicating the type of the attribute, the length of the attribute, and a value.

In the specification of the RADIUS protocol, it is specified to add a vender extension attribute other than the standardized RADIUS attribute by using a RADIUS attribute of Type 26. According to the present embodiment, therefore, the PANA session information is added to the RADIUS attribute of Type 26.

Referring back to FIG. 2, the relay controller 605 controls relay of communication between the terminal device 700 and the infrastructure network system 10. The relay controller 605 controls opening/closing of the port for each terminal device 700, and does not approve communication of the terminal device 700 until the 802.1X network access authentication is successful.

The configuration of the 1× Radius proxy 200 is explained next with reference to FIG. 6.

Figure 6:
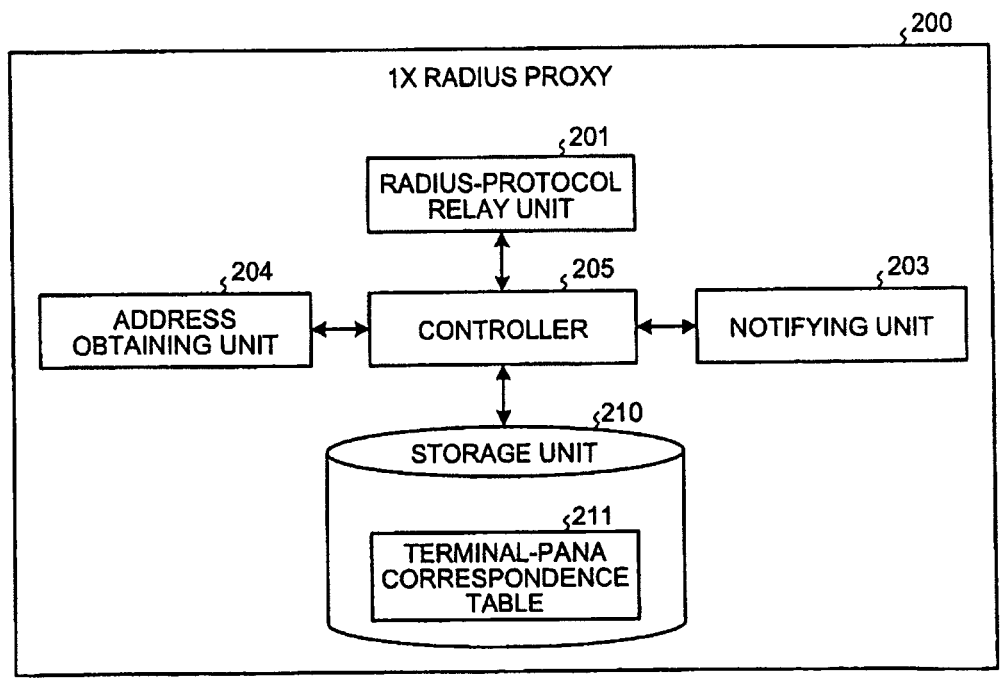
FIG. 6 is a block diagram of a configuration of 1× Radius proxy according to the embodiment.

As shown in FIG. 6, the 1× Radius proxy 200 includes a RADIUS-protocol relay unit 201, a notifying unit 203, an address obtaining unit 204, a controller 205, and a storage unit 210.

The storage unit 210 stores information of the terminal device 700 authenticated according to the 802.1X protocol, and the associated PANA session information, and also stores a terminal-PANA correspondence table 211.

As shown in FIG. 7, the terminal-PANA correspondence table 211 stores the device address of the terminal device 700 authenticated according to the 802.1X protocol, the authentication state by the 802.1X protocol, the PANA session information corresponding to the switching equipment 600 used for the 802.1X authentication, and the IP address allocated to the terminal device 700 authenticated according to the 802.1X protocol, in association with each other.

Referring back to FIG. 6, the RADIUS-protocol relay unit 201 relays a message according to the RADIUS protocol between the switching equipment 600 and the Radius server 100. The RADIUS-protocol relay unit 201 deletes the RADIUS attribute relating to the PANA session information, at the time of relaying the message.

The notifying unit 203 notifies the PANA PAA 400 of the PANA session information corresponding to the terminal device 700 authenticated according to the 802.1X protocol, and the IP address of the terminal device 700 authenticated according to the 802.1X protocol.

The address obtaining unit 204 transfers data between the DHCP server 300 and itself, to obtain the IP address allocated to the terminal device 700 authenticated according to the 802.1X protocol.

The controller 205 controls the address obtaining unit 204, the RADIUS-protocol relay unit 201, the notifying unit 203, and the storage unit 210. The controller 205 further updates the terminal-PANA correspondence table 211 stored in the storage unit 210, as required.

The configuration of the PANA PAA 400 is explained with reference to FIG. 8.

Figure 8:
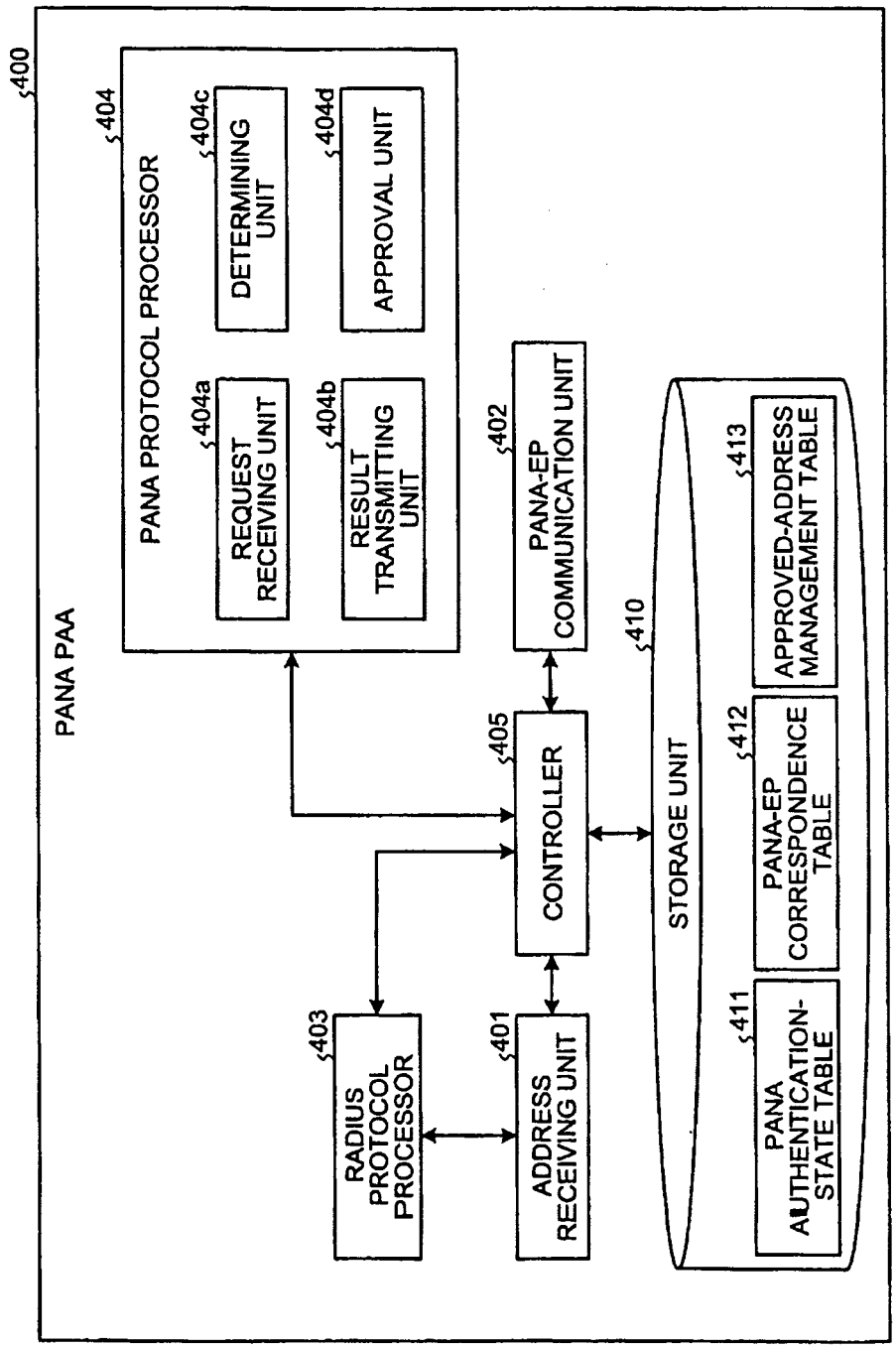
FIG. 8 is a block diagram of a configuration of PANA PAA according to the embodiment.

As shown in FIG. 8, the PANA PAA 400 includes an address receiving unit 401, a PANA-EP communication unit 402, a RADIUS protocol processor 403, a PANA protocol processor 404, a controller 405, and a storage unit 410.

The address receiving unit 401 receives a notification of the PANA session information corresponding to the terminal device 700 authenticated according to the 802.1X protocol and the IP address of the terminal device 700 authenticated according to the 802.1X protocol from the 1× Radius proxy 200.

The PANA-EP communication unit 402 notifies the PANA EP 500 of the IP address of the switching equipment 600 authenticated according to the PANA protocol or the IP address of the terminal device 700 authenticated according to the 802.1X protocol. Accordingly, the network access approval can be set by the PANA EP 500.

The RADIUS protocol processor 403 operates together with the PANA protocol processor 404, and exchanges a message according to the RADIUS protocol with the Radius server 100, to perform authentication of the switching equipment 600.

The PANA protocol processor 404 executes the PANA protocol with the switching equipment 600 in order to approve the network access of the switching equipment 600 to the infrastructure network system 10. That is, the PANA protocol processor 404 includes a relay function of the PANA protocol generally referred to as PAA.

The PANA protocol processor 404 includes a request receiving unit 404a, a determining unit 404c, a result transmitting unit 404b, and an approval unit 404d.

The request receiving unit 404a receives a message for requesting network access authentication according to the PANA from the switching equipment 600.

The determining unit 404c executes the network access authentication by the PANA according to the message received by the request receiving unit 404a, to determine whether to approve the network access. When approving an access, the determining unit 404c approves the network access of the switching equipment 600 according to the approval policy set by referring to a PANA-EP correspondence table 412 (described later).

The result transmitting unit 404b transmits a result of the access authentication to the switching equipment 600. The approval unit 404d applies the same approval policy as for the switching equipment 600 associated according to the PANA session ID with respect to the terminal device 700, to which the IP address is notified by the address receiving unit 401.

The controller 405 controls the operation of the address receiving unit 401, the PANA-EP communication unit 402, the RADIUS protocol processor 403, the PANA protocol processor 404, and the storage unit 410. The controller 405 updates the respective tables stored in the storage unit 210 as required.

The storage unit 410 stores various pieces of information for authenticating the terminal device 700 according to the PANA, and stores a PANA authentication-state table 411, the PANA-EP correspondence table 412, and an approved-address-management table 413. A configuration example of each table is explained with reference to FIGS. 9 to 11.

As shown in FIG. 9, the PANA authentication-state table 411 holds information of the switching equipment 600 authenticated according to the PANA. Specifically, the PANA authentication-state table 411 stores an ID (for example, a device address) of the switching equipment 600 authenticated according to the PANA, the PANA session ID, and an authentication state according to the PANA, in association with each other.

As shown in FIG. 10, the PANA-EP correspondence table 412 holds an association between the switching equipment 600 and the PANA EP 500, which requires approval setting when the switching equipment 600 is authenticated, and corresponds to the approval policy held by the PANA PAA 400. Specifically, the PANA-EP correspondence table 412 stores the ID of the switching equipment 600 in association with information indicating whether to require approval setting (O: approval setting is required, x: approval setting is not required) for each PANA EP 500 identified by the ID and the IP address. In the PANA-EP correspondence table 412, data pre-set at the time of system installation is stored.

As shown in FIG. 11, the approved-address management table 413 holds the PANA session ID and information of the IP address for which an approval related to the PANA session identified by the PANA session ID is performed. Specifically, the approved-address management table 413 stores the PANA session ID in association with a list of the corresponding IP address.

That is, in the approved-address management table 413, the IP address of the switching equipment 600 is stored together with the PANA session ID, when the access of the switching equipment 600 is approved according to the PANA. Further, in the approved-address management table 413, the IP address of the terminal device 700 is added as an address corresponding to the associated PANA session ID, when the access of the terminal device 700 is approved according to the 802.1X protocol.

The storage units in the respective devices (the storage units 610, 210, and 410) can be configured by any generally used recording medium such as a hard disk drive (HDD), an optical disk, a memory card, and a random access memory (RAM).

Figure 12:
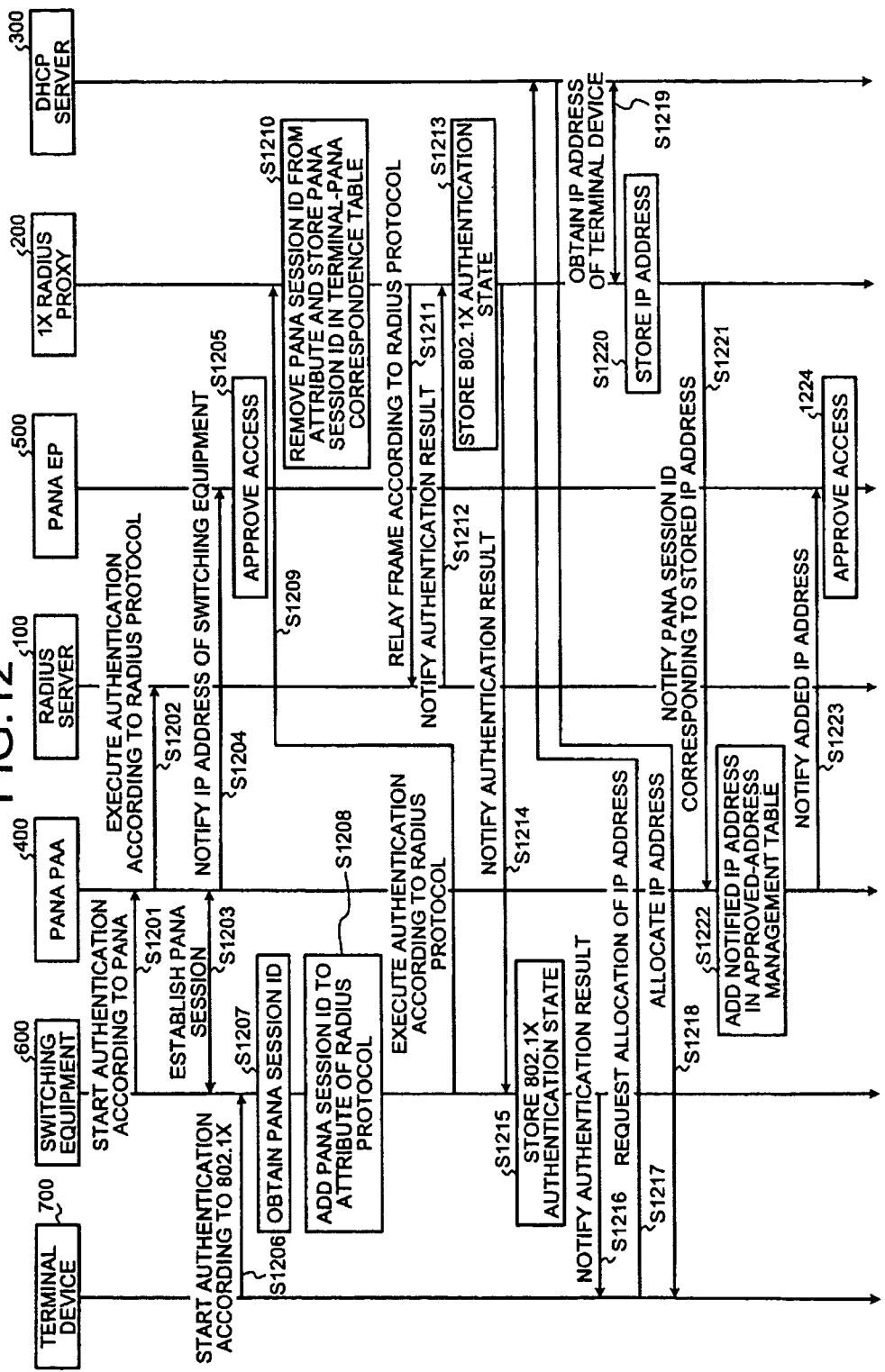
FIG. 12 is a sequence diagram of an overall flow of a communication process performed by the embodiment.

A communication process performed by the communication system according to the present embodiment configured in this manner is explained next with reference to FIG. 12.

First, the switching equipment 600 is connected to the infrastructure network system 10. Specifically, the request transmitting unit 603a of the switching equipment 600 transmits a message for requesting the network access authentication to start authentication according to the PANA (step S1201).

The PANA protocol processor 404 in the PANA PAA 400 executes the PANA protocol with the PANA protocol processor 603 in the switching equipment 600 to perform the network access authentication process of the switching equipment 600. It is assumed here that the switching equipment 600 obtains the IP address of the own device, using the DHCP server 300 or the like before execution of the PANA protocol.

Specifically, the request receiving unit 404a in the PANA protocol processor 404 receives a message for requesting the authentication. The determining unit 404c in the PANA protocol processor 404 starts up the RADIUS protocol processor 403 via the controller 405, as required, for executing the authentication process, and executes the authentication according to the RADIUS protocol with the Radius server 100 (step S1202).

The result transmitting unit 404b transmits the authentication result of the network access authentication process to the switching equipment 600. The authentication result is received by the result receiving unit 603b in the switching equipment 600. When the authentication is successful, the PANA session is established between the PANA protocol processor 603 (the communication establishing unit 603c) in the switching equipment 600 and the PANA protocol processor 404 in the PANA PAA 400 (step S1203). At this time, the communication establishing unit 603c stores the PANA session ID in the session information table 612 in the storage unit 610 via the relay controller 605, to change the PANA authentication state to "authenticated".

Further, the PANA protocol processor 404 in the PANA PAA 400 stores the ID of the switching equipment 600 and the PANA session ID in association with each other in the PANA authentication-state table 411 in the storage unit 410 via the controller 405, to change the PANA authentication state to "authenticated". The PANA protocol processor 404 stores the PANA session ID and the IP address of the switching equipment 600 in association with each other in the approved-address management table 413 via the controller 405.

After completion of authentication according to the PANA, the controller 405 in the PANA PAA 400 starts the network access approval process for the authenticated switching equipment 600. Specifically, the determining unit 404c refers to the pre-set PANA-EP correspondence table 412, using the ID of the authenticated switching equipment 600 as a key, to obtain the ID of the PANA EP 500 corresponding to the switching equipment 600.

The controller 405 then notifies the PANA EP 500 having the obtained ID of the IP address of the switching equipment 600 via the PANA-EP communication unit 402 so that the network access of the switching equipment 600 is approved (step S1204). For example, the controller 405 notifies the PANA EP 500 of the IP address of the switching equipment according to the SNMP or the like.

The PANA EP 500 having received the IF address approves the IP address of the specified switching equipment 600 (step S1205). Accordingly, the network access by the switching equipment 600 to the infrastructure network system 10 is approved.

Thereafter, the terminal device 700 is connected to the terminal device I/F 602 of the switching equipment 600. Specifically, the terminal device 700 transmits a message for requesting network access authentication to start authentication according to the EAPOL protocol for 802.1X (step S1206). The request receiving unit 604a in the switching equipment 600 receives the message according to the EAPOL protocol transmitted from the terminal device 700 via the terminal device I/F 602 and the relay controller 605.

Upon reception of the message according to other than the EAPOL protocol, the 802.1X protocol processor 604 obtains the authentication state of the terminal device 700 from the terminal authentication-state table 611, using a sender device address of the received message as a key. When there is no authentication state of the terminal device 700 or when the authentication state is "Reject", the 802.1X protocol processor 604 discards the received message. When the authentication state of the terminal device 700 is "Accept", the 802.1X protocol processor 604 sends the received message to the infrastructure network I/F 601.

The transfer unit 604b obtains the PANA authentication state from the session information table 612 via the relay controller 605. The transfer unit 604*b* confirms that the PANA authentication state is "authenticated", and obtains the PANA session ID from the session information table 612 (step S1207).

The transfer unit 604*b* then adds the obtained PANA session ID as an attribute of the RADIUS protocol (step S1208). The transfer unit 604*b* executes the RADIUS protocol with the 1× Radius proxy 200 via the infrastructure network I/F 601 to execute the authentication process of the terminal device 700 (step S1209).

The RADIUS-protocol relay unit 201 in the 1× Radius proxy 200 removes the PANA session ID added as the attribute from the message according to the RADIUS protocol received from the switching equipment 600. The RADIUS-protocol relay unit 201 stores the PANA session ID added as the attribute in association with the device address of the terminal device 700 included in the message according to the RADIUS protocol in the terminal-PANA correspondence table 211 via the controller 205 (step S1210).

Next, the RADIUS-protocol relay unit 201 relays the message according to the RADIUS protocol to the Radius server 100, with the PANA session ID being removed therefrom (step S1211). The RADIUS-protocol relay unit 201 relays the message according to the RADIUS protocol received from the Radius server 100 to the switching equipment 600.

The network access authentication of the terminal device 700 is thus performed by executing the 802.1X protocol between the terminal device 700 and the Radius server 100 via the switching equipment 600 and the 1× Radius proxy 200.

The Radius server 100 notifies the 1× Radius proxy 200 of the authentication result (step S1212). When the access is approved, the controller 205 in the 1× Radius proxy 200 updates the authentication state of the terminal device 700 having the corresponding device address in the terminal-PANA correspondence table 211 to "Accept" (step S1213).

The RADIUS-protocol relay unit 201 in the 1× Radius proxy 200 relays the authentication result to the switching equipment 600 (step S1214), and the relay controller 605 in the switching equipment 600 changes the authentication result of the corresponding terminal device 700 in the terminal authentication-state table 611 to "Accept" (step S1215). The authentication result is notified to the terminal device 700 via the switching equipment 600 (step S1216).

According to the process up to this stage, the network access approval of the terminal device 700 has been performed in the switching equipment 600. Accordingly, thereafter, when the terminal device 700 connected to the terminal device I/F 602 transmits a message to the switching equipment 600, the relay controller 605 in the switching equipment 600 confirms that the authentication state of the terminal device 700 is "Accept", and relays the received message to the infrastructure network I/F 601.

The terminal device 700, whose network access has been approved in the switching equipment 600, executes the DHCP protocol, to request allocation of the IP address to the own device to the DHCP server 300 (step S1217). On the other hand, the DHCP server 300 allocates the IP address to the terminal device 700 (step S1218). The DHCP server 300 holds the correspondence between the allocated IP address and the device address in the storage unit or the like.

On the other hand, after the authentication and approval according to the 802.1X protocol are complete, the address obtaining unit 204 in the 1× Radius proxy 200 obtains the device address of the terminal device 700 authenticated according to the 802.1X protocol from the terminal-PANA correspondence table 211. The address obtaining unit 204 inquires of the DHCP server 300 for the corresponding IP address, using the obtained device address as a key, to obtain the IP address allocated to the terminal device 700 (step S1219).

The address obtaining unit 204 registers the obtained IP address of the terminal device as a terminal device IP address of the corresponding terminal device 700 in the terminal-PANA correspondence table 211 via the controller 205 (step S1220).

Next, the notifying unit 203 in the 1× Radius proxy 200 obtains the PANA session ID corresponding to the registered IP address from the terminal-PANA correspondence table 211 via the controller 205 and notifies the PANA PAA 400 of the PANA session ID together with the registered IP address (step S1221). Accordingly, the notifying unit 203 requests the PANA PAA 400 to give network access approval according to the PANA to the terminal device 700 authenticated according to the 802.1X protocol.

The address receiving unit 401 in the PANA PAA 400 receives the notified IP address and the PANA session ID and stores the received information in the approved-address management table 413 via the controller 405 (step S1222). Specifically, the PANA session ID and the IP address of the terminal device 700 authenticated by the 802.1X corresponding thereto are added to the approved-address management table 413.

When the IP address to be approved is added to the PANA session ID, an access method approved to the terminal device 700 with the added IP address is confirmed. In the present embodiment, the same access method as that approved to the switching equipment 600 corresponding to the terminal device 700 is approved to the terminal device 700.

The approval unit 404*d* first specifies the ID of the corresponding switching equipment 600 (switching equipment ID) from the PANA authentication-state table 411, using the PANA session ID added with the IP address as a key. The approval unit 404*d* confirms that the PANA authentication state of the corresponding switching equipment is "authenticated". The approval unit 404*d* obtains the IP address of the corresponding PANA EP 500 from the PANA-EP correspondence table 412, using the ID of the switching equipment 600 as a key.

Next, the PANA-EP communication unit 402 notifies the PANA-EP 500 having the obtained IP address of the IP address added to the approved-address management table 413 (that is, IP address of the terminal device 700) according to the SNMP or the like (step S1223).

The PANA EP 500 having received the notification approves the IP address of the specified terminal device 700 (step S1224). According to such a process, the access to the infrastructure network system 10 can be approved by applying the authentication policy of the PANA with respect to not only the switching equipment 600 but also the terminal device 700 authenticated according to the 802.1X protocol.

Thereafter, network access of the terminal device 700 to the infrastructure network system 10 is enabled via the switching equipment 600. The network access approval of the terminal device 700 authenticated according to the 802.1X protocol depends on the PANA session of the switching equipment 600. Accordingly, when the PANA session of the switching equipment 600 is discarded, the network access approval of the terminal device 700 authenticated according to the 802.1X protocol is also discarded.

An outline of the access authentication process by the communication system using the switching equipment having only the terminal function of the PANA and the relay function of the 802.1X (hereinafter, "communication system A") is explained next for comparison with the present embodiment.

Figure 13:
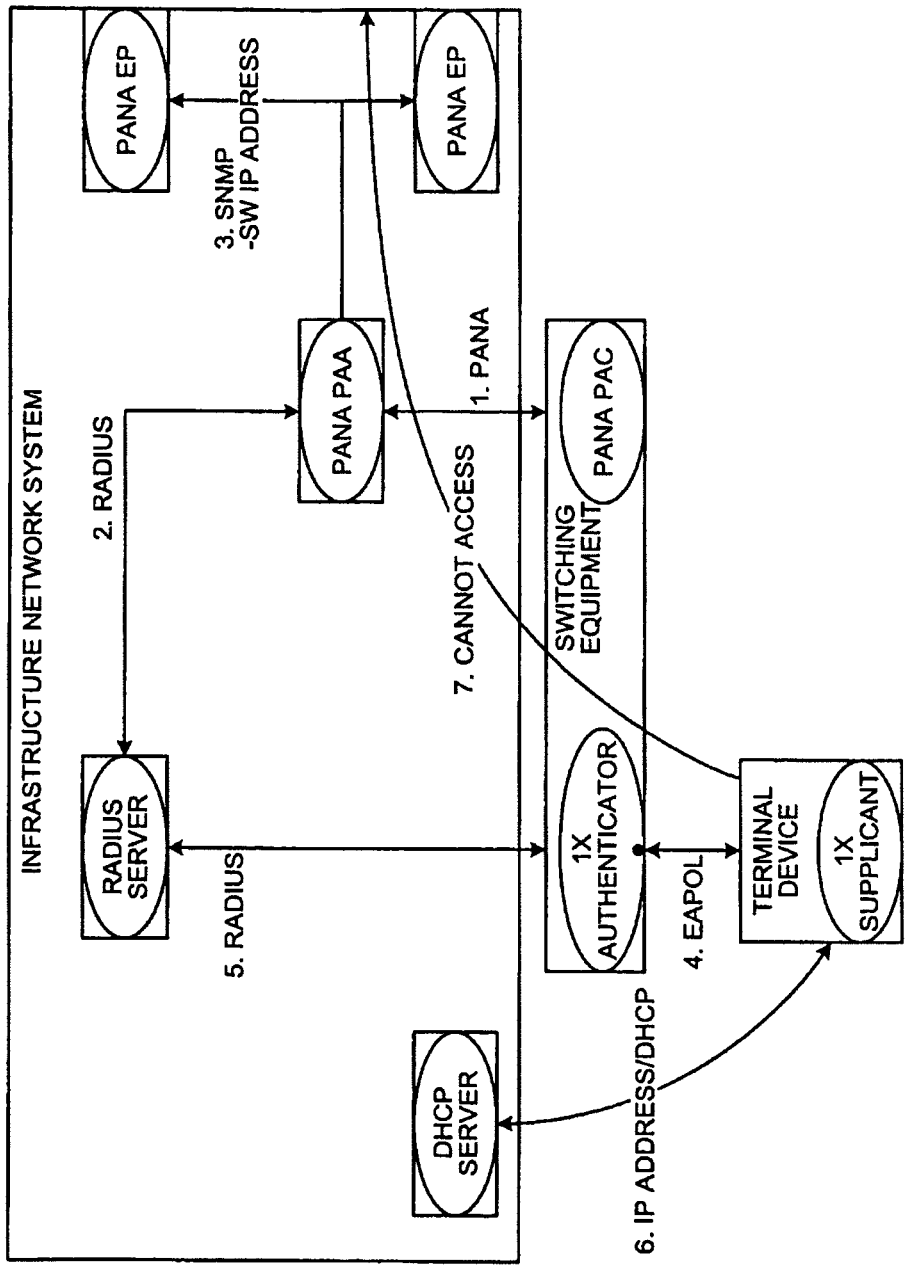
FIG. 13 is a schematic diagram for explaining another configuration example of the communication system.

Regarding the components of the system, as shown in FIG. 13, the communication system A is different from the present embodiment in a feature that there is no device corresponding to the 1× Radius proxy 200.

In the access authentication process performed by the communication system A, the switching equipment is connected to the infrastructure network system and the terminal device only corresponding to the 802.1X protocol is connected to the switching equipment, thereby connecting the terminal device to the infrastructure network system corresponding to the PANA and adopting the approval policy according to the PANA.

However, because the approval policy of the PANA cannot be set to the terminal device in the infrastructure network system, the terminal device can access only a part of the infrastructure network system.

Because the processes from 1 to 4 in FIG. 13 (approval process of the switching equipment and authentication starting process from the terminal device) are the same as those from (1) to (4) explained in FIG. 1, explanations thereof will be omitted.

After the EAPOL protocol has been started between the 1× Supplicant function of the terminal device and the 1× Authenticator function of the switching equipment (4), the switching equipment in the communication system A executes the processes below without performing an association process of the PANA session information ((5) in FIG. 1).

(5) The switching equipment having started the network access authentication of the terminal device executes the RADIUS protocol with the Radius server to execute the 802.1X authentication of the terminal device. Accordingly, the network access of the terminal device is approved by the switching equipment. As a result, the switching equipment opens and closes the port to which the terminal device is connected, and thereafter, relays the normal network access from the terminal device to the infrastructure network system.

(6) The terminal device, whose network access is approved by the switching equipment, executes the DHCP protocol to request the DHCP server to allocate an IP address to the own device. In response thereto, the DHCP server allocates an IP address to the terminal device.

(7) Thereafter, the terminal device can access the infrastructure network system via the switching equipment. However, because the network approval by the PANA EP is not set to the terminal device, the terminal device cannot access the service in the infrastructure network system connected to the infrastructure network system via the PANA EP.

Thus, only by simply using the switching equipment having the terminal function of the PANA and the relay function of the 802.1X, the authentication policy of the PANA cannot be applied to the terminal device corresponding only to the 802.1X protocol to approve an access to the network.

In the communication system of the present embodiment, when the network adopting the first authentication protocol (for example, 802.1X) is integrated with the network adopting the second authentication protocol (for example, PANA), the approval policy of the second authentication protocol can be applied to the terminal corresponding only to the first authentication protocol. That is, even when the approval policy is different from each other, the network systems according to the different network access authentication protocols can be interconnected.

Figure 14:
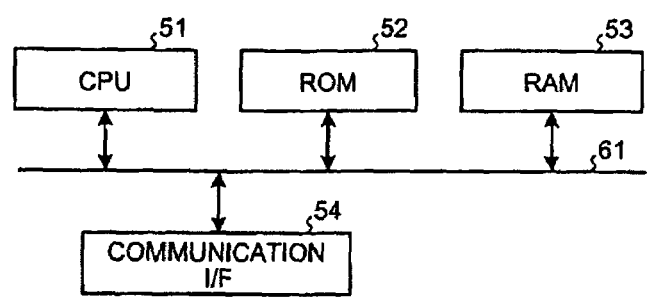
FIG. 14 is a schematic diagram for explaining a hardware configuration of respective apparatuses in the embodiment.

A hardware configuration of the respective devices (1× Radius proxy, PANA PAA, and switching equipment) constituting the communication system according to the present embodiment is explained with reference to FIG. 14.

The respective devices in the present embodiment includes a controller such as a central processing unit (CPU) 51, a storage unit such as a read only memory (ROM) 52 and a RAM 53, a communication I/F 54 that connects to the network to perform communication, and a bus 61 that connects the respective units.

The 1× Radius proxy and the PANA PAA further include an external storage unit such as an HDD and a compact disk (CD) drive, a display device such as a display unit, and an input unit such as a keyboard and a mouse, and have a hardware configuration using a general computer.

The program executed by the respective devices in the present embodiment is recorded in a computer readable recording medium such as a compact disk read only memory (CD-ROM), a flexible disk (FD), a compact disk recordable (CD-R), and a digital versatile disk (DVD) in an installable format or an executable file, and provided.

The program executed by the respective devices in the embodiment can be stored on a computer connected to a network such as the Internet and downloaded via the network. Further, the program executed by the respective devices in the embodiment can be provided or distributed via the network such as the Internet.

The program in the present embodiment can be incorporated in the ROM or the like to be provided.

The program executed by the respective devices in the embodiment has a module configuration including the above components. As actual hardware, the CPU 51 (processor) reads the program from the recording medium to execute the program, thereby loading the respective units on a main memory so that the respective units are generated on the main memory.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication system comprising:
    a first relaying apparatus that relays communication from a terminal device connected via a first network to a second network, wherein the terminal device corresponds to a first authentication protocol and does not correspond to a second authentication protocol;
    a second relaying apparatus that relays communication to a first authentication apparatus that is connected to the first relaying apparatus via a second network and authenticates the terminal device according to the first authentication protocol; and
    a second authentication apparatus that is connected to the first relaying apparatus via the second network and performs access authentication for the first relaying apparatus with respect to the second network according to the second authentication protocol, wherein
    the first relaying apparatus includes:
    an identification-information storage unit that can store identification information for identifying communication for the first relaying apparatus to access the second network;
    a request transmitting unit that transmits a first request message to the second authentication apparatus, the first request message requesting access authentication for the first relaying apparatus to access the second network;
a result receiving unit that receives a determination result of whether to approve an access of the first relaying apparatus to the second network, which is a response to the first request message, from the second authentication apparatus;
a communication establishing unit that establishes communication from the first relaying apparatus to the second network, and stores the identification information of the established communication in the identification-information storage unit, when the determination result indicating approval of the access of the first relaying apparatus to the second network is received;
a first request receiving unit that receives a second request message from the terminal device, the second request message requesting access authentication for the terminal device to access the second network; and
a transfer unit that obtains the identification information from the identification-information storage unit and transfers the second request message added with the obtained identification information to the second relaying apparatus, when the second request message is received,
the second relaying apparatus includes:
a relay unit that receives the second request message added with the obtained identification information from the first relaying apparatus and relays the received second request message to the first authentication apparatus; and
a notifying unit that notifies the second authentication apparatus of address information of the authenticated terminal device associated with the identification information added to the second request message, when the terminal device as a sender of the second request message is authenticated by the first authentication apparatus, and
the second authentication apparatus includes:
a second request receiving unit that receives a first request message from the first relaying apparatus;
a determining unit that determines whether to approve an access of the first relaying apparatus to the second network based on the received first request message and confirms an access method preset for each first relaying apparatus, with respect to the first relaying apparatus whose access has been approved;
a result transmitting unit that transmits a determination result by the determining unit to the first relaying apparatus;
an address receiving unit that receives the address information associated with the identification information from the second relaying apparatus; and
an approval unit that approves an access of the terminal device in the received address information to the second network by the access method confirmed for the first relaying apparatus, which has established communication identified by the identification information associated with the received address information.

2. An authentication apparatus that is connected to a first relaying apparatus that relays communication from a terminal device connected via a first network to a second network and to a second relaying apparatus that relays communication to an external authentication apparatus that authenticates the terminal device according to a first authentication protocol via the second network, and authenticates an access to the second network according to a second authentication protocol, wherein the terminal device corresponds to the first authentication protocol and does not correspond to the second authentication protocol, the authentication apparatus comprising:
a request receiving unit that receives a request message from the first relaying apparatus, the request message requesting access authentication for the first relaying apparatus to access the second network;
a determining unit that determines whether to approve an access of the first relaying apparatus to the second network based on the received request message and confirms an access method preset for each first relaying apparatus, with respect to the first relaying apparatus whose access has been approved;
a result transmitting unit that transmits a determination result by the determining unit to the first relaying apparatus;
an address receiving unit that receives the address information of the terminal device associated with identification information for identifying communication with the first relaying apparatus whose access to the second network has been approved, from the second relaying apparatus; and
an approval unit that approves an access of the terminal device in the received address information to the second network by the access method confirmed for the first relaying apparatus, which has established communication identified by the identification information associated with the received address information.

3. The apparatus according to claim 2, wherein the second authentication protocol is Protocol for Carrying Authentication for Network Access (PANA),
the address receiving unit receives the address information of the terminal device associated with the identification information, which is a session ID of a PANA session between the first relaying apparatus whose access to the second network has been approved and the authentication apparatus, from the second relaying apparatus, and
the approval unit approves the access of the terminal device in the received address information to the second network by the access method confirmed for the first relaying apparatus, which has established the PANA session identified by the session ID associated with the received address information.

4. The apparatus according to claim 2, wherein the address receiving unit receives the address information, which is an IP address of the terminal device associated with the identification information, from the second relaying apparatus, and
the approval unit approves the access of the terminal device of the received IP address to the second network by the access method confirmed for the first relaying apparatus, which has established the communication identified by the identification information associated with the received IP address.

5. The apparatus according to claim 2, wherein the determining unit determines whether to approve the access of the first relaying apparatus to the second network by using the external authentication apparatus.

6. A relaying apparatus that is connected to a terminal device via a first network, and connected via a second network to an external device that relays communication to a first authentication apparatus that authenticates the terminal device according to a first authentication protocol, and to a second authentication apparatus that performs access authentication to the second network according to a second authentication protocol, thereby relaying communication from the terminal device to the second network, wherein the terminal device corresponds to the first authentication protocol and does not correspond to the second authentication protocol, the relaying apparatus comprising:
- an identification-information storage unit that can store identification information for identifying communication for the relaying apparatus to access the second network;
- a request transmitting unit that transmits a first request message to the second authentication apparatus, the first request message requesting access authentication for the relaying apparatus to access the second network;
- a result receiving unit that receives a determination result of whether to approve an access of the relaying apparatus to the second network, which is a response to the first request message, from the second authentication apparatus;
- a communication establishing unit that establishes communication to the second network, and stores the identification information of the established communication in the identification-information storage unit, when the determination result indicating approval of the access of the relaying apparatus to the second network is received;
- a request receiving unit that receives a second request message from the terminal device, the second request message requesting access authentication for the terminal device to access the second network; and
- a transfer unit that obtains the identification information from the identification-information storage unit and transfers the second request message added with the obtained identification information to the external device, when the second request message is received.

7. The apparatus according to claim 6, wherein
the first authentication protocol is the IEEE 802.1X,
the second authentication protocol is Protocol for Carrying Authentication for Network Access (PANA),
the communication establishing unit establishes a PANA session between the second authentication apparatus and the relaying apparatus, and stores the identification information, which is a session ID of the established PANA session, in the identification-information storage unit, when the determination result indicating approval of the access of the relaying apparatus to the second network is received,
the request receiving unit receives the second request message according to an Extensible Authentication Protocol over LAN (EAPOL) protocol in the IEEE 802.1X from the terminal device, and
the transfer unit obtains the session ID from the identification-information storage unit, and transfers the second request message added with the obtained session ID as an attribute of a Remote Authentication Dial In User Service (RADIUS) protocol in the IEEE 802.1X, to the external device, when the second request message is received.

8. A relaying apparatus that is connected to an external device that relays communication from a terminal device connected via a first network to a second network and to a second authentication apparatus that performs access authentication to the second network according to a second authentication protocol via the second network, and relays communication to a first authentication apparatus that authenticates the terminal device according to a first authentication protocol, wherein the terminal device corresponds to the first authentication protocol and does not correspond to the second authentication protocol, the relaying apparatus comprising:
- a relay unit that receives from the external device a request message for requesting authentication of an access of the terminal device to the second network, added with identification information for identifying communication for the external device to access the second network, and relays the received request message to the first authentication apparatus; and
- a notifying unit that notifies the second authentication apparatus of address information of the authenticated terminal device associated with the identification information added to the request message, when the terminal device as a sender of the request message is authenticated by the first authentication apparatus.

9. The apparatus according to claim 8, wherein
the first authentication protocol is the IEEE 802.1X,
the second authentication protocol is Protocol for Carrying Authentication for Network Access (PANA),
the relay unit receives, from the external device, the request message, and relays the received request message to the first relaying apparatus, the request message being a message according to a Remote Authentication Dial In User Service (RADIUS) protocol in the IEEE 802.1X for requesting authentication of the access of the terminal device to the second network, added with the identification information, which is a session ID of a PANA session, as an attribute according to the RADIUS protocol, and
the notifying unit notifies the second authentication apparatus of the address information of the authenticated terminal device in association with the session ID added to the request message, when the terminal device as the sender of the request message is authenticated by the first authentication apparatus.

10. The apparatus according to claim 8, further comprising:
- an address obtaining unit that obtains the address information as an IP address of the terminal device, from an address managing unit connected via the second network, wherein
the notifying unit notifies the second authentication apparatus of the IP address obtained for the authenticated terminal device in association with the identification information added to the request message, when the terminal device as the sender of the request message is authenticated by the first authentication apparatus.

11. A communication method performed by a communication system that includes a first relaying apparatus that relays communication from a terminal device connected via a first network to a second network, wherein the terminal device corresponds to a first authentication protocol and does not correspond to a second authentication protocol; a second relaying apparatus that relays communication to a first authentication apparatus that is connected to the first relaying apparatus via the second network and authenticates the terminal device according to the first authentication protocol; and a second authentication apparatus that is connected to the first relaying apparatus via the second network and performs access authentication for the first relaying apparatus with respect to the second network according to the second authentication protocol, the communication method comprising:
- transmitting a first request message to the second authentication apparatus, the first request message requesting access authentication for the first relaying apparatus to access the second network;
- receiving the first request message from the first relaying apparatus;
- determining whether to approve an access of the first relaying apparatus to the second network based on the received first request message, to confirm an access method preset for each first relaying apparatus, with respect to the first relaying apparatus whose access has been approved;

transmitting a determination result of whether to approve the access to the first relaying apparatus;

receiving the determination result from the second relaying apparatus;

establishing communication from the first relaying apparatus to the second network, when the determination result indicating approval of the access of the first relaying apparatus to the second network is received, and storing the identification information for identifying the established communication in a storage unit;

receiving a second request message from the terminal device, the second request requesting access authentication for the terminal device to access the second network;

obtaining the identification information from the storage unit and transferring the second request message added with the obtained identification information to the second relaying apparatus, when the second request message is received, receiving the second request message added with the identification information from the first relaying apparatus, and relaying the received second request message to the first authentication apparatus;

notifying the second authentication apparatus of address information of the authenticated terminal device associated with the identification information added to the second request message, when the terminal device as a sender of the second request message is authenticated by the first authentication apparatus;

receiving the address information associated with the identification information from the second relaying apparatus; and approving the access of the terminal device in the received address information to the second network by the access method confirmed for the first relaying apparatus, which has established communication identified by the identification information associated with the received address information.

* * * * *